United States Patent [19]
Hoff et al.

[11] 3,872,227
[45] Mar. 18, 1975

[54] FORMULATION FOR ORAL ADMINISTRATION OF PENICILLINS HAVING IMPROVED TASTE PROPERTIES

[75] Inventors: Dieter Hoff, Leverkusen; Kurt Bauer, Opladen, both of Germany

[73] Assignee: Bayer Aktiengesellschaft, Leverkusen, Germany

[22] Filed: Feb. 28, 1973

[21] Appl. No.: 336,478

[30] Foreign Application Priority Data
Mar. 8, 1972   Germany............................ 2211019

[52] U.S. Cl. ............................................... 424/271
[51] Int. Cl............................................. A61k 21/00
[58] Field of Search........................... 424/271, 319

[56] References Cited
OTHER PUBLICATIONS

The Merck Index, 8th Ed., Merck & Co., Inc., Rahway, N.J., 1968, page 75.
Chemical Abstracts 72:52181v, (1970).

*Primary Examiner*—Jerome D. Goldberg

[57] ABSTRACT

Formulations for the oral administration of various penicillins comprise a penicillin and an aminoacid, a salt of an aminoacid, or a mixture of aminoacids or salts of aminoacids. This combination results in a formulation having an improved taste.

20 Claims, No Drawings

FORMULATION FOR ORAL ADMINISTRATION OF PENICILLINS HAVING IMPROVED TASTE PROPERTIES

The present invention relates to new formulations for the oral administration of various penicillins and derivatives thereof. Among the penicillins which are generally orally administered are phenoxymethylpenicillin, propicillin and ampicillin. Each of these generally exhibits an unpleasant bitter taste. Hitherto it has not been possible to embody such penicillins in a formulation which does not exhibit to the patient recieving the formulation an unpleasant bitter type of taste.

While in the past it was generally not considered necessary to improve the taste of medicines since the patient was frequently convinced that a medicine had to have a bitter or unpleasant taste in order to be effective, it is believed obviously advantageous in this more enlightened time to produce formulations for oral administration which are as pleasant to the patient as possible without sacrificing any effectiveness of the medication to be administered. Thus, while in the past a medicine was generally considered to be more effective the more unpleasant and the more bitter its taste was, patients now are generally more enlightened and frequently complain that medicines prescribed have an unpleasant taste and that they experience unpleasant taste sensations from taking such medicine. Under these circumstances it has often become difficult to ensure the regular oral administration of such medicine since patients are repelled by the taste and/or odor of various medicines, including the above-mentioned penicillins and thus decline to take them regularly as prescribed. In addition, a repellent taste or an unpleasant taste or odor can disturb the normal function of the digestive system. Nausea, vomiting and loss of appetite may occur. In addition to the above-noted penicillins, PAS (p-aminosalicylic acid) preparations, sulphonamides, antibiotics and various other penicillin derivatives, are concrete examples of medicines which suffer from unpleasant taste and/or odor.

The present invention overcomes the disadvantages by a new and unique formulation which renders the medicine more pleasant to take orally. Thus, disturbances of the digestive system, as mentioned above, which may lead to a delayed or inadequate absorption of the medicine, are overcome. Children who frequently rebel at taking medicines with unpleasant tastes will be more inclined to take formulations according to the present invention since they are unaccompanied by such unpleasant taste and odor.

In theory, the taste of medicines can be improved in various ways:

a. The taste of a medicine can be improved by balancing a clearly prominent type of taste — "bitter" in the case of penicillins — with the three other types, namely salty, sweet and acid. According to K. Munzel, J. Buchi and O. -E. Schultz in *Galenisches Praktikum*, Stuttgart (1958), page 916 et Seq., sodium chloride can be used for the "salty" flavor, sugar or synthetic soluble sweeteners, for example, sodium saccharin or sodium cyclamate, can be used for "sweet" and citric acid or tartaric acid can be used for "acid."

b. On the other hand it is possible to ameliorate an unpleasant, for example, bitter, taste by adding mucins which increase the viscosity. As such, it is possible to use agar-agar, gum arabic, alginates or methylcellulose derivatives.

The possibilities listed under a) and b) can, however, not be used for the orally-administered penicillins mentioned, for the following reasons:

1. If it were desired to employ the two above-mentioned principles of improving a taste, it would be necessary to use aqueous solutions, suspensions or emulsions.

2. However, as is known, penicillins decompose very rapidly in such aqueous media, and therefore become inactive.

3. From the bio-pharmaceutical point of view it is furthermore simply a faulty use of the art to encase penicillins in high molecular mucilagenous substances, since this results in reduced absorption of the penicillin in question. The penicillins are released too slowly and too late from these mucins in the gastric and intestinal tract.

However, particularly in the case of penicillin preparations, it is necessary to achieve a rapid commencement of their effect, and a high serum level.

c. It is also possible to mask the taste by coating penicillins directly with masking auxiliaries, for example, by producing microcapsules in accordance with the so-called NCR process. (See German Offenlegungschrift No. 1,141,256.) However, in this case again the same remarks as under 3) apply: In order to mask the taste well, a relatively large amount of encapsulating material is required, which delays the release of the active compound in the gastric and intestinal tract.

d. An improvement in the taste, especially in the case of medicines having a bitter taste, can also be achieved by adding a sweetening component. As such, sugar, glucose, fructose, invert sugar, maltose, mannitol or sorbitol can be used.

In the case of tablets, however, the use of sweeteners is limited since the amount of sugar that can be accommodated in a tablet frequently possesses inadequate sweetening power. Furthermore, the tablet composition tends to stick to the punches and dyes of the tablet-compressing machines in the case of tablets of high sugar content. Tablets containing sugar are hydroscopic and are therefore rather unsuitable for use as a vehicle for penicillins.

For this reason, synthetic sweeteners, such as, for example, sodium cyclamate, saccharin, sodium saccharin or Dulcin, are mainly used instead of the natural sweeteners.

However, these synthetic sweeteners have an unpleasant bitter aftertaste, particularly in higher doses, which, in part, again annuls the sweentening effect in the case of bitter medicinal substances.

According to the present invention, the surprising discovery was made that by combining an aminoacid, a salt of an aminoacid, or a mixture of aminoacids or a mixture of salts of aminoacids to a penicillin or penicillin derivative, it was possible to eliminate, or at least substantially reduce, the bitter taste of the penicillin in a formulation suitable for oral administration. The present invention, therefore, comprises a pharmaceutical composition useful for oral administration which comprises a penicillin in combination with an aminoacid, a salt of an aminoacid, a mixture of aminoacids, or a mixture of salts of aminoacids.

The penicillin may be any penicillin or penicillin derivative used in the treatment of gram-positive and/or gramnegative bacterial infections and may be used in any form which is suitable for oral administration, such as, for example, the sodium or potassium salt forms. The present invention has been found to be particularly useful with phenoxymethylpenicillin, propicillin, and ampicillin, which are three widely-used penicillins.

Among the preferred aminoacids useful in the formulation of the present invention are sarcosin, alanine, β-alanine, taurine, serine, threonine, glutamic acid, glutathione and glycine, glycine being particularly preferred.

The amount of amino acid, salt thereof, mixture of aminoacids, or mixture of salts thereof, is preferably 0.3 to 10 parts per part by weight of penicillin. According to a preferred embodiment of the present invention, a preferred ratio would be 1 to 5 parts per part by weight of penicillin.

As additional taste improvers, the pharmaceutical compositions of the present invention can also contain sugar, d-glucose, maltose, fructose, sorbitol, mannitol, cyclamates (e.g., sodium cyclohexylsulphamate or calcium cyclohexylsulphamate), saccharin, sodium saccharin and Dulcin.

Any desired flavor can be imparted to the compositions of the present invention by the addition of appropriate known flavoring substances such as fruit extracts and essences. Examples of such flavors are as follows: orange, lemon, raspberry, strawberry, cherry, pineapple, banana, peach, maple, vanilla, cocoa, caramel, currant, blackberry, grenadine, peppermint, coconut, cinnamon, apricot and gooseberry.

Edible dyestuffs or other colorants may be added to improve the appearance of the compositions of the present invention.

It is also possible to include disintegrating or effervescing agents, such as a mixture of citric acid and sodium bicarbonate.

The pharmaceutical compositions of the present invention may, for example, be made up as powders, granules, effervescent granules, and dry preparations for making up syrups.

These compositions may contain, in addition to the flavoring and coloring agents mentioned above, any of the conventional excipients and other auxiliaries used in pharmaceutical compositions. Examples of such excipients are colloidal silicic acid such as Aerosil, or Cab-O-Sil, cornstarch, stearic acid and stearates, cellulose and its derivatives, surface active agents and binders, such as polyvinylpyrrolidone.

The pharmaceutical compositions of the present invention may be made up into dosage units. A dosage unit is a discrete, coherent article containing a predetermined individual quantity of the penicillin such that one such article or a small number — for example, up to 5 of such articles — is suitable for a single therapeutic administration. Examples of dosage units are tablets, lozenges, chewable tablets, effervescent tablets, granules or powder mixtures to be dissolved in water or syrup before application.

The following examples more particularly illustrate the compositions of the present invention. Unless otherwise specified, the parts are parts by weight.

EXAMPLE 1 — Ampicillin Lozenges, 1 g each 20 parts of glycine, 3.8 parts of cornstarch, 0.3 parts of stearic acid powder, 2.7 parts of talc and 2 parts of sodium cyclamate are well mixed in a dry mixer, and are then sieved.

33.3 parts of ampicillin, 35 parts of glycine, 1 part of Aerosil and 0.3 parts of magnesium stearate are mixed into 28.8 parts of this pre-mix. Thereafter, this powder is converted in the usual manner into granules for pressing.

1.2 parts of a tutti-frutti dry flavoring and 0.4 parts of magnesium stearate are mixed into these granules and lozenges weighing 3.0 g are pressed from the finished mixture. The lozenges can be taken readily, because of their pleasant taste.

EXAMPLE 2 — Ampicillin Effervescent Granules, 500 mg per 4.1-gram dose 0.05 parts of FD & C Red No. 2 specially pure is finely ground with 9.35 parts of sugar. This dyestuff mixture is subsequently well mixed in a suitable mixer with 12.2 parts of ampicillin, 61 parts of alanine and 12.2 parts of anhydrous citric acid. Alcohol, in which 0.2 parts of saccharin is dissolved, is used for granulation. The granules are dried, then sieved and mixed with 3.6 parts of sodium bicarbonate and 1.4 parts of cherry dry essence.

Dissolving 4.1 g of these granules in water gives an ampicillin solution tasting pleasantly of cherries.

EXAMPLE 3 — Ampicillin Dry Preparation for Syrups 33.3 parts of ampicillin, 25 parts of glycine, 25 parts of alanine and 13 parts of sugar are mixed in a kneader and well moistened with a solution of 0.2 parts of polyvinylpyrrolidone and 0.1 part of sodium saccharin. Thereafter the mixture is dried in a vacuum drying oven. The granules are sieved and finally 3.4 parts of wild cherry dry flavoring are also mixed in.

On dissolving 9.0 g of the granules in 60 ml of a 10 per cent strength sugar solution lightly colored with amaranth (FD & C Red No. 2), a pleasant-tasting syrup is obtained.

EXAMPLE 4 — Ampicillin Effervescent Tablets, 250 mg. each 50 parts of dry sodium citrate and 8 parts of dry citric acid are granulated in a suitable mixer with a solution of 0.3 parts of saccharin and 0.1 part of Sunset Yellow (FD & C yellow No. 6) in alcohol. The granules are dried in a fluidized bed and subsequently sieved.

58.4 parts of this pre-mix are further mixed homogeneously with 6.6 parts of ampicillin, 9.7 parts of serine, 24.2 parts sodium bicarbonate, 0.9 parts of apricot dry essence and 0.2 parts of tangerine dry essence.

Effervescent tablets weighing 3.8 g each are prepared in a conventional manner from these granules. When dissolved in water, these effervescent tablets give an aromatic ampicillin solution having a good taste.

EXAMPLE 5 — Phenoxymethylpenicillin Tablets, 1 mega units each 32.7 parts of phenoxymethylpenicillin (employed as the potassium salt), 50 parts of glycine and 0.8 parts of magnesium stearate are mixed in a mixer. Dry granules are subsequently produced from this powder in the usual manner.

0.5 parts of sodium saccharin and 9 parts of cornstarch are mixed. The resulting pre-mix is combined with 83.5 parts of dry granules and 5.5 parts of cellulose powder, and 1.5 parts of raspberry dry flavoring are also added.

From the resulting ready-to-press mixture, it is possible to produce tablets weighing 2.0 g each, which, because of their good flavor, can be disintegrated by chewing and therefore facilitate taking the medicine.

EXAMPLE 6 — Phenoxymethylpenicillin Granules, 600,000U per 3.2 g dose 0.05 parts of FD & C Yellow No. 6, 0.4 parts of sodium cyclamate, 5 parts of sugar, and 10 parts of glycine are mixed and finely ground. 12.3 parts of phenoxymethylpenicillin (employed as the potassium salt), 31.3 parts of alanine, 5.6 parts of glycine and 5.2 parts of sugar are mixed into this colored pre-mix in a suitable mixer. The batch is granulated with a solution of 1.6 parts of polyvinylpyrrolidone in a mixture of equal parts of alcohol and chloroform. It is subsequently dried in a circulating air drying oven.

The dry granules are sieved, mixed with 28.5 parts of orange flavoring and well mixed.

3.2 g of these easily soluble granules give, with water a phenoxymethylpenicillin drink which hardly retains a bitter taste.

EXAMPLE 7 — Phenoxymethylpenicillin Effervescent Tablets, 600,000 U each 32 parts of citric acid, 38 parts of sodium bicarbonate, 4.1 parts of sugar, 16 parts of glycine and 1.6 parts of serine are mixed and finely powdered by means of a mill. This mixture is subsequently uniformly moistened, in a kneader, with an alcoholic solution of 0.2 parts of sodium saccharin and dried in a fluidized bed.

The sieved granules are mixed with 7.1 parts of phenoxymethylpenicillin (either as the acid, or employed as the potassium salt, corresponding to 7.8 parts), 0.5 parts of tutti-frutti dry flavoring and 0.5 parts of sodium benzoate.

Effervescent tablets weighing 5.0 g each are prepared from this mixture and when dissolved in water give an aromatic, pleasant-tasting phenoxymethylpenicillin solution.

EXAMPLE 8 — Propicillin Instant Powder, 400,000 U per 3.0 g dose 9.3 parts of propicillin, 22.8 parts of sugar, 13.3 parts of taurine and 33.3 parts of glycine are mixed in a suitable mixing apparatus and granulated with an alcoholic solution of 1.7 parts of polyvinylpyrrolidone and 0.5 parts of saccharin. 10.7 parts of sodium citrate are added while continuing to mix, and thereafter the mixture is dried in a vacuum oven. 7 parts of sodium bicarbonate and 1.4 parts of wild cherry dry flavoring are additionally mixed into the dry, sieved granules.

3.0 g of these granules rapidly dissolve in water and give a propicillin solution which only retains a slight bitter taste.

EXAMPLE 9 — Propicillin Lozenges, 400,000 U each

A pre-mix is prepared from 17.5 parts of propicillin, 35 parts of alanine, 35 parts of glycine and 0.9 parts of Aerosil. After sieving, 4.3 parts of cornstarch, 5 parts of cellulose powder and 0.4 parts of magnesium stearate are added, the whole is well mixed and dry granules are prepared in the usual manner.

1.5 parts of blackberry dry flavoring and 0.4 parts of magnesium stearate are mixed with these dry granules.

Lozenges weighing 1.6 g each, which can readily be taken, are prepared from the granules.

EXAMPLE 10 — Propicillin Dry Preparation for Syrups, 1 megs each 0.1 parts of FD & C Red No. 3, specially pure, 0.4 parts of sodium cyclamate and 3.3 parts of sugar are throughly premixed.

11.7 parts of propicillin, 17.3 parts of sugar, 46.7 parts of glycine, 8.3 parts of threonine, 3.3 parts of glutamic acid and 3.3 parts of very finely ground sodium carboxymethylcellulose are added to this pre-mix and the whole is mixed and subsequently granulated with a solution of 0.6 parts of methylcellulose in an alcohol-methylene-chloride mixture. The granules are dried in a fluidized bed, sieved and mixed with 5.0 parts of strawberry dry flavoring.

On dissolving 6.0 g of the propicillin dry preparation for syrups in water, a ready-to-use syrup of aromatic flavor is obtained.

What is claimed:

1. An orally administrable pharmaceutical composition which comprises in combination ampicillin and an amino acid selected from the group consisting of glycine, a mixture of equal parts of glycine and alanine and a mixture of equal parts of glycine and β-alanine, in the proportions of 0.3 to 10 parts by weight of amino acid per part by weight of ampicillin.

2. A pharmaceutical composition according to claim 1 wherein the proportion is 1 to 5 parts by weight of said member per part by weight of the penicillin.

3. A pharmaceutical composition according to claim 1 in tablet form.

4. A pharmaceutical composition according to claim 1 in powder form.

5. A pharmaceutical composition according to claim 1 in the form of granules.

6. A pharmaceutical composition according to claim 1 in the form of effervescent granules.

7. A pharmaceutical composition according to claim 1 in the form of effervescent tablets.

8. A pharmaceutical composition according to claim 1 in the form of lozenges.

9. An ampicillin lozenge according to claim 8 wherein said amino acid is glycine.

10. A pharmaceutical composition according to claim 1 in syrup form

11. An ampicillin syrup according to claim 10 wherein said amino acid is a mixture of equal parts of glycine and alanine.

12. A pharmaceutical composition according to claim 1 which further comprises a sweetener.

13. A pharmaceutical composition according to claim 1 which further comprises a flavoring agent.

14. A pharmaceutical composition according to claim 1 which further comprises an edible dyestuff.

15. A pharmaceutical composition according to claim 1 which further comprises a sweetener and a flavoring agent.

16. A pharmaceutical composition according to claim 1 which further comprises a sweetener, a flavoring agent and an edible dyestuff.

17. A pharmaceutical composition according to claim 1 which further comprises a sweetener and an edible dyestuff.

18. A pharmaceutical composition according to claim 1 which further comprises a flavoring agent and edible dyestuff.

19. A pharmaceutical composition according to claim 1 wherein said amino acid is glycine.

20. A pharmaceutical composition according to claim 1 wherein said amino acid is a mixture of equal parts of glycine and alanine.

* * * * *